United States Patent
DeCusatis et al.

(10) Patent No.: US 7,272,320 B2
(45) Date of Patent: Sep. 18, 2007

(54) TIME DIVISION MULTIPLEXING OF INTER-SYSTEM CHANNEL DATA STREAMS FOR TRANSMISSION ACROSS A NETWORK

(75) Inventors: Casimer M. DeCusatis, Poughkeepsie, NY (US); Thomas A. Gregg, Highland, NY (US); Jayakrishna M. Menon, Milpitas, CA (US)

(73) Assignees: International Business Machines Corporation, Armonk, NY (US); Cisco Technology Incorporated, San Jose, CA (US)

( * ) Notice: Subject to any disclaimer, the term of this patent is extended or adjusted under 35 U.S.C. 154(b) by 792 days.

(21) Appl. No.: 10/706,373

(22) Filed: Nov. 12, 2003

(65) Prior Publication Data

US 2005/0100337 A1    May 12, 2005

(51) Int. Cl.
*H04J 14/08* (2006.01)
(52) U.S. Cl. .......................................... 398/98; 398/75
(58) Field of Classification Search ................. 398/75, 398/98, 99, 100, 101, 102, 103; 370/505
See application file for complete search history.

(56) References Cited

U.S. PATENT DOCUMENTS

| | | | | |
|---|---|---|---|---|
| 5,428,649 | A * | 6/1995 | Cecchi | 375/372 |
| 5,610,945 | A * | 3/1997 | Gregg et al. | 375/260 |
| 6,111,897 | A * | 8/2000 | Moon | 370/535 |
| 6,151,336 | A | 11/2000 | Cheng et al. | 370/535 |
| 6,226,296 | B1 * | 5/2001 | Lindsey et al. | 370/401 |
| 6,356,367 | B1 | 3/2002 | DeCusatis et al. | 359/110 |
| 6,359,709 | B1 | 3/2002 | DeCusatis et al. | 359/110 |
| 6,359,713 | B1 | 3/2002 | DeCusatis et al. | 359/179 |
| 6,438,285 | B1 | 8/2002 | DeCusatis et al. | 385/24 |

OTHER PUBLICATIONS

Lebar, Metod, "Increasing the Productivity of Existing Fiber," Communications Engineering & Design, Jan. 2002, pp. 1-3.
"TimePilot—Time Division Mulitplexer 4-1," Controlware GmbH, 2002, pp. 1-6.
Karve, Anita, "Wave Division Multiplexing," Network Magazine, Aug. 1999, pp. 1-4, retrieved from the Internet on Apr. 30, 2003 http://www.networkmagazine.com.
"CMX-IG2/CMX-G2 Fiber Channel/Gigabit Ethernet Multiplexer 2-Channel Multiplexer Card," pp. 1-2, retrieved from the Internet on May 1, 2003 http://www.agtprint.com.
"Cisco ONS 15200 and ONS 15454: The Metro DWDM and Next-Generation Transport Solution," pp. 1-6, retrieved from the Internet on Apr. 30, 2003 http://www.cisco.com.

* cited by examiner

*Primary Examiner*—Christina Leung
(74) *Attorney, Agent, or Firm*—John E. Campbell; Kevin P. Radigan, Esq.; Heslin, Rothenberg, Farley & Mesiti, P.C.

(57) ABSTRACT

A time division multiplexing (TDM) facility is presented for time division multiplexing at least two inter-system channel (ISC) data streams to create a TDM multiplexed data stream. The TDM multiplexed data stream can be forwarded across the network over a single wavelength of a wavelength division multiplexing (WDM) network. The TDM multiplex data stream may be wavelength division multiplexed with one or more other TDM multiplexed data stream. Different protocols are presented for maintaining disparity balance within the ISC data streams depending upon whether a given sequence in one of the data streams is an idle sequence, frame sequence or continuous sequence.

21 Claims, 3 Drawing Sheets

TIME DIVISION MULTIPLEXING OF INTER-SYSTEM CHANNEL DATA STREAMS FOR TRANSMISSION ACROSS A NETWORK

TECHNICAL FIELD

The present invention relates in general to data communications, and more particularly, to a facility for time division multiplexing (TDM) at least two inter-system channel (ISC) data streams to create a common, TDM multiplexed data stream, while also preserving data disparity.

BACKGROUND OF THE INVENTION

Fiber optic communication links are an integral part of many computer systems. Since it is quite expensive to construct new fiber optic lines, various approaches have been devised to increase system capacity. These approaches include optical wavelength division multiplexing (WDM), dense wavelength division multiplexing (DWDM), coarse wavelength division multiplexing (CWDM) and, for certain data formats, time division multiplexing (TDM).

In a WDM or DWDM system, multiple optical channels are carried over a single optical fiber, each channel being assigned a particular optical wavelength. By using a single, existing optical fiber to carry multiple channels, DWDM has been found to be an efficient approach for increasing the capacity of data communication systems.

Each channel in a current DWDM system can carry data at speeds up to 10 Gbit/s. This works well for data that is being transmitted at such speeds, however, it is obviously inefficient to use a channel capable of 10 Gbit/s to transmit a signal at a substantially lower data rate.

TDM modules have been employed, for certain data formats, in an attempt to avoid such inefficiency. At the transmitting end of a TDM system, an electronic switch (multiplexing unit) picks up signals from multiple input channels, in a predetermined "channel-by-channel" order. A resulting multiplexed signal, which combines such input signals, is constructed and forms the "output" or transmitting end of the TDM system. The multiplexed signal is distributed to receiving terminal equipment as the output of the transmitting end of the module. TDM is discussed in detail in various publications, including a textbook by A. B. Carlson and D. G. Gisser entitled: *Electrical Engineering Concepts and Applications*, published by Addison-Wesley, N.Y. (1991), which is hereby incorporated herein by reference in its entirety.

Existing TDM modules typically work with a specific fixed data format. For example, modules have been designed to operate with the FDDI data format, while others work only in the Ethernet data format.

SUMMARY OF THE INVENTION

Presented herein is an approach to extending the time division multiplexing (TDM) application to inter-system channel (ISC) links. Further, the extension is accomplished in such a way so as to preserve data disparity.

Provided, in one aspect, is a method which includes: time division multiplexing (TDM) at least two inter-system channel (ISC) data streams to create a TDM multiplexed data stream; and outputting the TDM multiplexed data stream for forwarding across a network.

In further aspects, the network may comprise a wavelength division multiplexing (WDM) network, and the method may further include wavelength division multiplexing the TDM multiplexed data stream with at least one other data stream onto a single wavelength for forwarding across the WDM network. Still further, the time division multiplexing can employ a first-in first-out (FIFO) buffer, and include at least one of inserting and deleting words in at least one data stream of the at least two ISC data streams to balance input and output FIFO buffer clock rates. This at least one of inserting and deleting of words is performed so as to maintain disparity balance within the least two ISC data streams. In addition, the at least two ISC data streams may include at least some of idle sequences, frame sequences and continuous sequences, and the at least one of inserting and deleting can include employing a first protocol for the idle sequences and frame sequences, and a second protocol for the continuous sequences within the ISC data stream. Examples of the first and second protocol are described and claimed.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Dense wavelength division multiplexing (DWDM) has emerged as a principal approach for transmitting tens to hundreds of independent data links over only a few optical fibers. This approach is employed by International Business Machines Corporation in metropolitan area networks (50-100 km distances) for disaster recovery applications, such as the Geographically Dispersed Parallel Sysplex (GDPS) application.

IBM's Parallel Sysplex architecture, such as the z/900 and z/800 Enterprise Servers, employs coupling links referred to as inter-system channel (ISC) Parallel Sysplex coupling links. A data stream passing on one of these links is referred to herein as an ISC data stream. Various aspects of ISC links have been described in numerous prior publications, including U.S. Pat. Nos. 6,438,285; 6,359,713; 6,359,709; and 6,356,367, each of which is hereby incorporated herein by reference in its entirety.

Currently available DWDM solutions are capable of multiplexing up to 32 wavelengths over a single fiber pair. Recently, the data rate of a single wavelength has increased into the 2.5-10 Gbits/s range, making it possible to time division multiplex (TDM) multiple data channels over a single wavelength. Thus, presented herein is an approach for time division multiplexing at least two data streams in inter-system channel (ISC) data format, for example, for use in a GDPS. Advantageously, significant cost savings can be realized by the techniques presented herein, for example, by allowing multiple ISC channels to share a single wavelength in a DWDM network.

Figure 1:
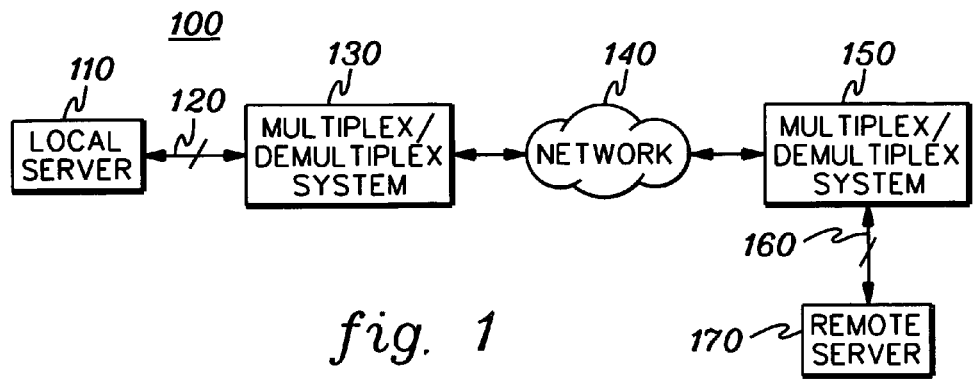
FIG. 1 depicts one example of a networked computer environment to employ multiplex/demultiplex systems in accordance with an aspect of the present invention.

FIG. 1 depicts one example of a networked computer environment, generally denoted 100 to employ multiplex/demultiplex systems 130, 150, which can be implemented in accordance with aspects of the present invention. Computer environment 100 includes a local server 110, which employs multiple links 120 in sending and receiving data across a network 140. Multiplex/demultiplex system 130, such as a wavelength division multiplexing system, is employed to increase transmission capacity of optical fibers comprising part of network 140. Similarly, multiplex/demultiplex system 150 is employed between network 140 and a remote server 170, which receives and transmits data across multiple links 160. As noted, in one implementation, networked computer environment 100 may employ inter-system channel (ISC) links, for example, as links 120 & 160 from/to local server 110 and remote server 170, respectively. ISC coupling links are marketed, for example, by International Business Machines Corporation for use in communicating between senders and receivers, such as within a Parallel Sysplex environment.

Figure 2:
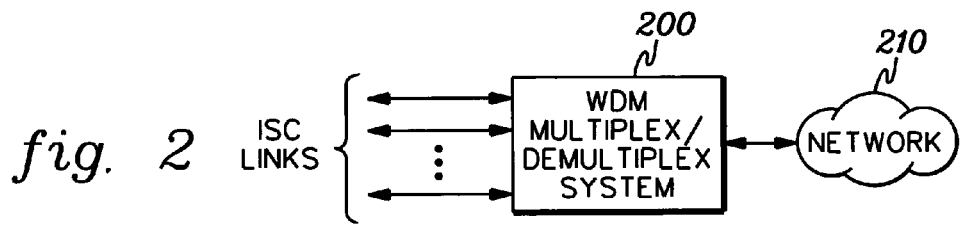
FIG. 2 depicts one partial embodiment of a networked computing environment employing a wavelength division multiplexing (WDM) multiplex/demultiplex system for inter-system channel (ISC) links.

FIG. 2 depicts one implementation for a multiplex/demultiplex system facility 200 interfacing between multiple ISC links and a network 210. This multiplex/demultiplex system comprises a wavelength division multiplexing (WDM) system wherein a plurality of ISC links or channels are multiplexed onto a WDM link for transmission of data across network 210. For example, currently 32 wavelengths may be mapped onto to a single physical cable, with each wavelength being dedicated to a particular ISC link.

Figure 3:
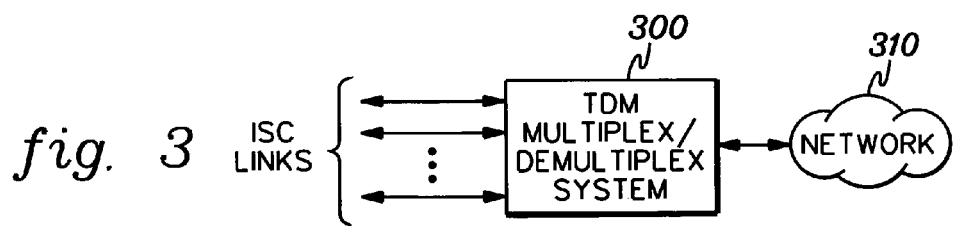
FIG. 3 depicts one partial embodiment of a networked computing environment utilizing a time division multiplexing (TDM) multiplex/demultiplex system for ISC links, in accordance with an aspect of the present invention.

FIG. 3 depicts a partial embodiment of a network computing environment wherein a time division multiplexing (TDM) multiplex/demultiplex system 300 is employed to interface between at least two ISC links and a network 310. There are a number of considerations when attempting to time division multiplex ISC channel protocols. For example, a TDM implementation commonly uses a first-in, first-out (FIFO) buffering scheme. Time division multiplexing will break down if the outbound data clocking rate differs from the inbound clock rate. One way to compensate for differences is to either insert or delete words into one or more of the ISC data streams. In order to accomplish this without violating data disparity, it is necessary to account for different data structures on an ISC channel and the effects the scheme will have on the attached processors.

Figure 4:
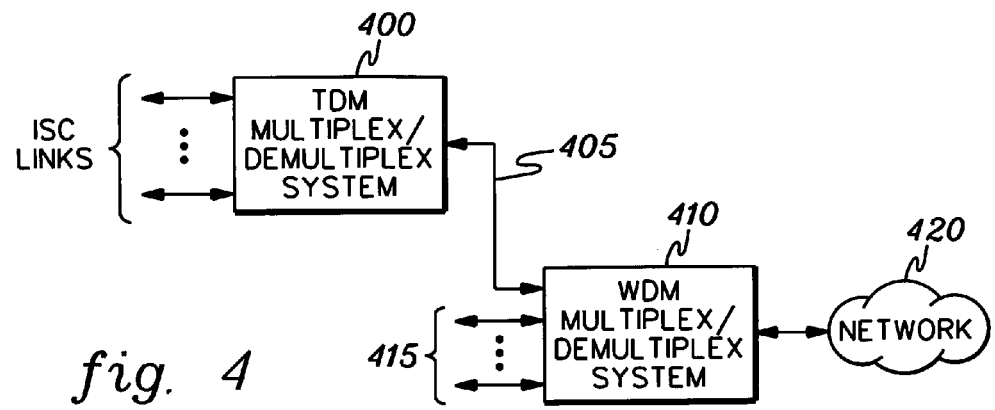
FIG. 4 depicts one partial embodiment of a networked computing environment employing a WDM multiplex/demultiplex system and a TDM multiplex/demultiplex system for ISC links, in accordance with an aspect of the present invention.

Before describing the ISC data stream protocol in greater detail, FIG. 4 depicts an alternate embodiment of a network computer environment wherein two or more ISC data streams are TDM multiplexed by system 400 to create a TDM multiplexed data stream 405, which is then wavelength division multiplexed by WDM multiplex/demultiplex system 410 with one or more additional data streams 415 before forwarding across a network 420. Additional data streams 415 could themselves comprise TDM multiplexed data streams, with each TDM multiplexed data stream being assigned a particular wavelength of the available wavelengths of a WDM (or DWDM or CWDM) link. By way of specific example, TDM multiplex/demultiplex system 400 could implement a 2:1 TDM at 2.5 Gbits/s or an 8:1 TDM at 10 Gbits/s, while WDM multiplex/demultiplex system 410 may implement a 32:1 wavelength division multiplexing of data streams onto a TDM multiplexed link.

Returning to the ISC protocol, today's ISC channel comprises 1024 words, 4 bytes each, for a total of over 4000 bytes (plus some overhead) in a frame. This includes a 4 byte idle word, 4 bytes of data, a 4 byte CRC check, 4096 bytes of data, another 4 byte CRC check, and a 4 byte idle word. ISC channels were originally designed to adjust their data transfer rate to match the processor cycle time by inserting null words into the data stream. An ISC-1 channel link needs to maintain at least 4 idle words between successive data frames. It should always be safe to insert null words in the data stream, but as a safeguard to preserve parity this should be done in pairs. Null words should be deleted in pairs for the same reasons. It should be noted that some non-IBM implementations of ISC channels will check for valid disparity of the null words, so this part of the architecture should be maintained.

In order to maintain a minimum safe idle spacing between data frames, the TDM system should wait for a sequence of at least 8 continuous idle words and delete one pair to leave a minimum spacing of 6 words (the minimum of 4 plus a margin of 2). This should be possible for most links which are at low utilization, though care must be taken to not run out of idles if they are being deleted from multiple points along the networked computer environment. This imposes a restriction that the FIFO overrun prevention must not require more idles to be inserted than the maximum number of add/drop nodes in a network (for example, 2 nodes in a point-to-point network).

There are three types of data transfer which can occur in the ISC channel: idles, frames, and continuous sequences. For the first two types, the approach above-described of inserting/deleting two null words is sufficient to maintain disparity. In the final case, it may be necessary to delete both a pair of idles and a data word in order to keep the proper disparity. The idle and null format permits them to be used in this way.

One method for frequency tolerance compensation (in accordance with an aspect of the present invention) is outlined below using the following notation:

/I/=an idle word
/N/=a null word

/D/=a dataword within a Frame
/C/=a dataword within a Continuous sequence
/Cx/=an explicit dataword [C1 through C4] corresponding to the 4 types of dataword used in Continuous sequences (i) Compensation within Idle Sequences (Inter-Frame-Gap)
Insertion:
Wait for a sequence of two /I/ words, ignoring any /N/words,
Add two /I/ words.
Deletion:
Wait for a sequence of eight /I/ words, ignoring any /N/
Remove a desired number of /N/words which occur between 2 consecutive /I/ words being removed,
Remove in pairs, a desired number of /I/ words.

(ii) Compensation within Continuous Sequences
Insertion:
Wait for one sequence of /C/I/C/I/, ignoring any /N/words
Add a /C/I/ word-pair (replicate the last /C/I/ pair).
Deletion:
Wait (ignoring any /N/) for a sequence of /Cx/I/Cx/I/
Remove one /Cx/I/ word-pair.

For (i) Deletion described above, this approach will remove any /N/ word which might intervene inbetween the 2/I/ words which are being removed. This is significantly easier to implement than preserving the /N/ word in the data stream. For example, consider the following:
Example sequence before idle deletion:
/D/D/D/D/I/N/I/I/N/I/I/I/N/N/N/I/
Example sequence after idle deletion:
/D/D/D/D/I/N/I/I/N/I/I/I/

The (ii) Deletion approach is acceptable, even though it can potentially leave just one /Cx/I/ pair in the stream if there were only 2 such pairs in the stream to start with.
Example before deletion:
/D/D/D/D/I/N/C2/I/C2/I/N/N/N/I/
After idle deletion:
/D/D/D/D/I/N/I/N/C2/I/I/N/N/I/

Figure 5:
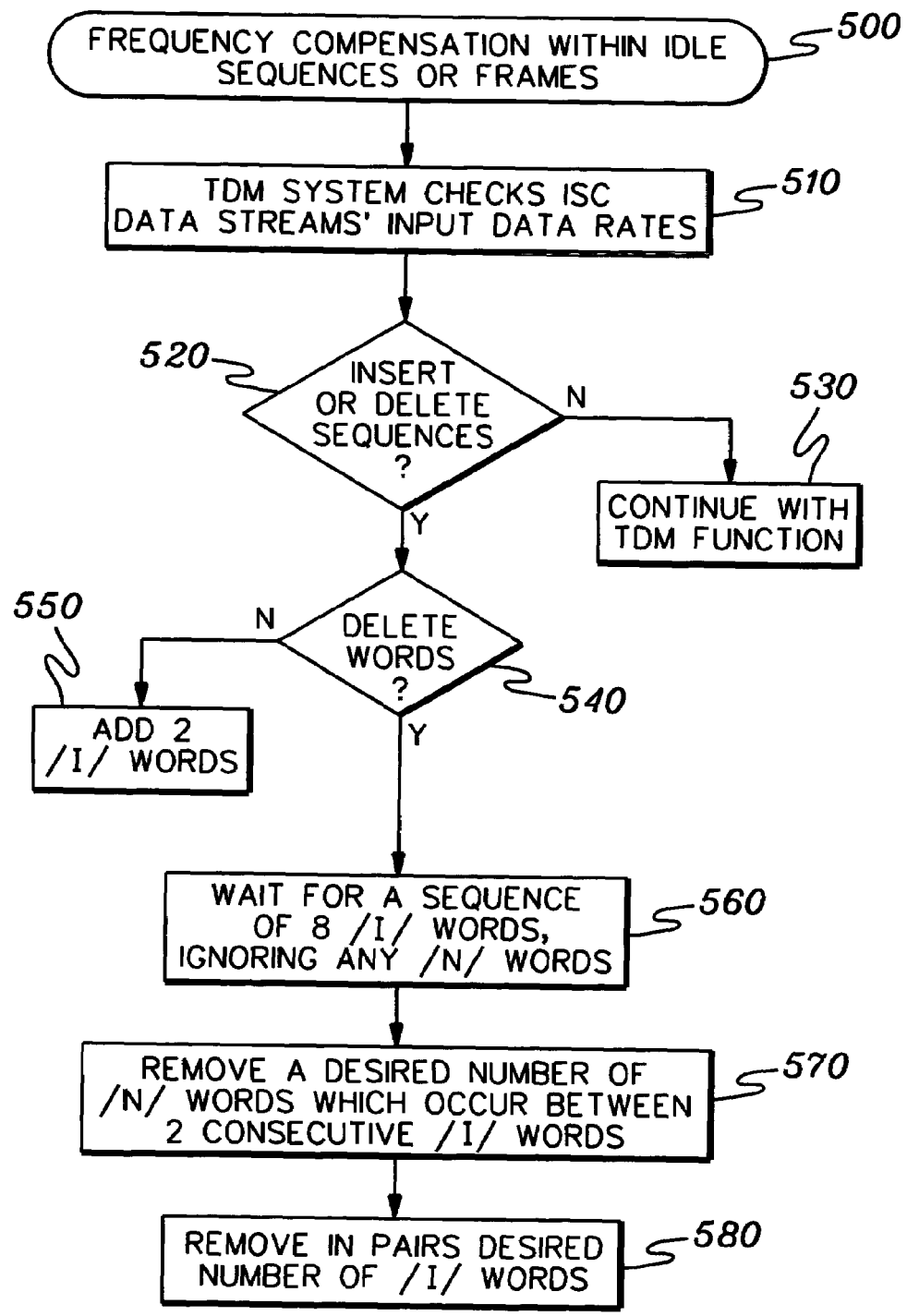
FIG. 5 is a flowchart of one embodiment of processing implemented by a TDM multiplex/demultiplex system for evaluating need for and performing frequency compensation within idle sequences or frame sequences in one or more of at least two ISC data streams being time division multiplexed, in accordance with an aspect of the present invention.
Figure 6:
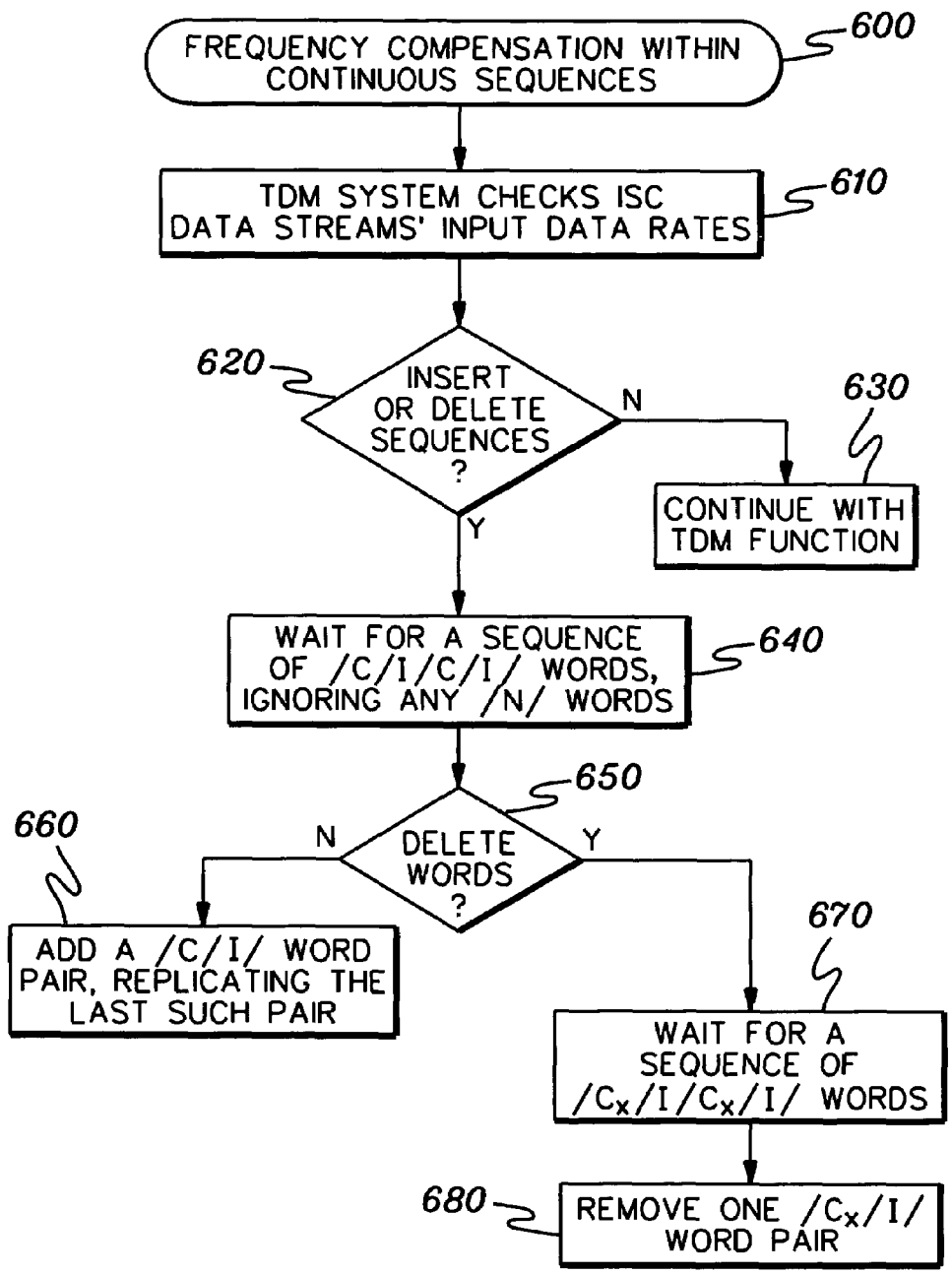
FIG. 6 is a flowchart of one embodiment of processing implemented by a TDM multiplex/demultiplex system for determining need for and performing frequency compensation within continuous sequences in one or more of at least two ISC data streams being time division multiplexed, in accordance with an aspect of the present invention.

FIGS. 5 & 6 depict flowchart examples for frequency compensation within idle sequences or frames, as well as continuous sequences, respectfully. Beginning with FIG. 5, frequency compensation within idle sequences or frames 500 begins with a TDM system checking the ISC data streams' input data rates 510. In this discussion, an assumption is made that the TDM system is continuously monitoring buffer inputs so that the particular sequence within the data stream is known at any given time. Thus, the particular frequency compensation of FIG. 5 or FIG. 6 is readily selected as needed. The TDM system determines whether it is necessary to insert or delete words within a sequence 520, and if not, the time division multiplexing function proceeds 530. Otherwise, processing determines whether words are to be deleted 540. If no, then two idle words 550 are added. Otherwise, processing waits for a sequence of eight idle words, ignoring any null words 560. Once such a sequence is identified, a desired number of null words occurring between two consecutive idle words are removed 570. Null words are removed between two idle words which are also to be removed. Idle words are removed in pairs 580.

In FIG. 6, frequency compensation within a continuous sequence 600 begins with the TDM system checking the ISC data streams' input data rates 610. Processing determines whether inserting or deleting of words is required 620, and if not, continues with TDM function processing 630. Otherwise, the TDM system waits for a repeated sequence of continuous word idle word pairs, ignoring any null words 640. Once detected, processing determines whether words are being added or deleted 650. If added, then a continuous word idle word pair is added, replicating the last such pair 660. Otherwise, processing waits for a repeated sequence of continuous word idle word pairs 670, and removes one such pair 680.

Latency is another consideration for TDM multiplexing of ISC channels. The use of TDM multiplexers introduces additional latency on the data links, which depends on the design of the time division multiplexer, the data rate of the signals being multiplexed, and the frame sizes being multiplexed. For faster processors, for example, processors in the IBM z/900 server line, latency has a significant impact on system performance. For 2 Gbits/s ISC links, low latency is more important to system performance than the increased bandwidth available compared with 1 Gbits/s ISC links. It is estimated that time division multiplexing of ISC channels through a pair of DWDM devices in a point-to-point network will incur an additional latency which should be acceptable without impacting performance compared with an approach which does not time division multiplex the ISC channels.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:
1. A method comprising:
time division multiplexing (TDM) at least two inter-system channel (ISC) data streams to create a TDM multiplexed data stream;
outputting the TDM multiplexed data stream for forwarding across a network;
wherein said time division multiplexing employs a first-in first-out (FIFO) buffer and said method further includes at least one of inserting and deleting words in at least one data stream of said at least two ISC data streams to balance input and output FIFO buffer clocking rates;
wherein the at least two ISC data streams comprise at least some of idle sequences, frame sequences and continuous sequences, and wherein said at least one of inserting and deleting comprises employing a first protocol for idle sequences and frame sequences and a second protocol for continuous sequences within the at least one ISC data stream of the at least two ISC data streams; and wherein the first protocol comprises:
waiting for a sequence of two idle words, ignoring any null words, and determining whether to insert or delete words from the at least one ISC data stream;
if inserting words, adding two idle words subsequent to the two idle words that were detected, and if deleting words, waiting for a sequence of eight idle words, ignoring any null words between the eight idle words, and removing a desired number of null words which occur between two consecutive idle words, and removing in pairs a desired number of idle words.

2. The method of claim 1, further comprising forwarding the TDM multiplexed data stream across a network over a single wavelength.

3. The method of claim 2, wherein the network comprises a wavelength division multiplexing (WDM) network.

4. The method of claim 3, further comprising wavelength division multiplexing the TDM multiplexed data stream with at least one other data stream onto the single wavelength for forwarding across the WDM network.

5. The method of claim 4, wherein the at least one other data stream comprises at least one other TDM multiplexed data stream.

6. The method of claim 1, wherein said at least one of inserting and deleting words maintains disparity balance within each of the at least two ISC data streams.

7. The method of claim 1, wherein the second protocol comprises:
waiting for a sequence of two continuous word idle word pairs, ignoring any null words;
determining whether to insert or delete words; and
if adding words, adding a continuous word idle word pair replicating the last such pair, and if deleting words, waiting for a sequence of two continuous word idle word pairs, and removing one continuous word idle word pair replicating the detected sequence of continuous word idle word pairs.

8. A system comprising:
means for time division multiplexing (TDM) at least two inter-system channel (ISC) data streams to create a TDM multiplexed data stream;
means for outputting the TDM multiplexed data stream for forwarding across the network;
wherein said means for time division multiplexing employs a first-in first-out (FIFO) buffer and said system further includes at least one of means for inserting and means for deleting words in at least one data stream of said at least two ISC data streams to balance input and output FIFO buffer clocking rates;
wherein the at least two ISC data streams comprise at least some of idle sequences, frame sequences and continuous sequences, and wherein said at least one of means for inserting and means for deleting comprises means for employing a first protocol for idle sequences and frame sequences and a second protocol for continuous sequences within the at least one ISC data stream of the at least two ISC data streams; and
wherein the second protocol comprises:
waiting for a sequence of two continuous word idle word pairs,
ignoring any null words;
determining whether to insert or delete words; and
if adding words, adding a continuous word idle word pair replicating the last such pair, and if deleting words, waiting for a sequence of two continuous word idle word pairs, and removing one continuous word idle word pair replicating the detected sequence of continuous word idle word pairs.

9. The system of claim 8, further comprising means for forwarding the TDM multiplexed data stream across a network over a single wavelength.

10. The system of claim 9, wherein the network comprises a wavelength division multiplexing (WDM) network.

11. The system of claim 10, further comprising means for wavelength division multiplexing the TDM multiplexed data stream with at least one other data stream onto the single wavelength for forwarding across the WDM network.

12. The system of claim 11, wherein the at least one other data stream comprises at least one other TDM multiplexed data stream.

13. The system of claim 8, wherein said at least one of means for inserting and means for deleting words maintains disparity balance within each of the at least two ISC data streams.

14. A system comprising:
means for time division multiplexing (TDM) at least two inter-system channel (ISC) data streams to create a TDM multiplexed data stream;
means for outputting the TDM multiplexed data stream for forwarding across the network;
wherein said means for time divisions multiplexing employs a first-in first-out (FIFO) buffer and said system further includes at least one of means for inserting and means for deleting words in at least one data stream of said at least two ISC data streams to balance input and output FIFO buffer clocking rates;
wherein the at least two ISC data streams comprise at least some of idle sequences, frame sequences and continuous sequences, and wherein said at least one means for inserting and means for deleting comprise means for employing a first protocol for idle sequences and frame sequences and a second protocol for continuous sequences within the at least one ISC data stream of the at least two ISC data streams; and
wherein the first protocol comprises:
waiting for a sequence of two idle words, ignoring any null words, and determining whether to insert or delete words from the at least one ISC data stream;
if inserting words, adding two idle words subsequent to the two idle words that were detected, and if deleting words, waiting for a sequence of eight idle words, ignoring any null words between the eight idle words, and removing a desired number of null words which occur between two consecutive idle words, and removing in pairs a desired number of idle words.

15. At least one program storage device readable by a machine, embodying at least one program of instructions executable by the machine to perform a method, said method comprising:
time division multiplexing (TDM) at least two inter-system channel (ISC) data streams to create a TDM multiplexed data stream;
outputting the TDM multiplexed data stream for forwarding across the network;
wherein said time division multiplexing employs a first-in first-out (FIFO) buffer and said method further includes at least one of inserting and deleting words in at least one data stream of said at least two ISC data streams to balance input and output FIFO buffer clocking rates;
wherein the at least two ISC data streams comprise at least some of idle sequences, frame sequences and continuous sequences, and wherein said at least one of inserting and deleting comprises employing a first protocol for idle sequences and frame sequences and a second protocol for continuous sequences within the at least one ISC data stream of the at least two ISC data streams; and wherein the first protocol comprises:
waiting for a sequence of two idle words, ignoring any null words, and determining whether to insert or delete words from the at least one ISC data stream;
if inserting words, adding two idle words subsequent to the two idle words that were detected, and if deleting words, waiting for a sequence of eight idle words, ignoring any null words between the eight idle words, and removing a desired number of null words which occur between two consecutive idle words, and removing in pairs a desired number of idle words.

16. The at least one program storage device of claim 15, further comprising forwarding the TDM multiplexed data stream across a network over a single wavelength.

17. The at least one program storage device of claim 16, wherein the network comprises a wavelength division multiplexing (WDM) network.

18. The at least one program storage device of claim 17, further comprising wavelength division multiplexing the TDM multiplexed data stream with at least one other data stream onto the single wavelength for forwarding across the WDM network.

19. The at least one program storage device of claim 18, wherein the at least one other data stream comprises at least one other TDM multiplexed data stream.

20. The at least one program storage device of claim 15, wherein said at least one of inserting and deleting words maintains disparity balance within each of the at least two ISC data streams.

21. The at least one program storage device of claim 15, wherein the second protocol comprises:
waiting for a sequence of two continuous word idle word pairs, ignoring any null words;
determining whether to insert or delete words; and
if adding words, adding a continuous word idle word pair replicating the last such pair, and if deleting words, waiting for a sequence of two continuous word idle word pairs, and removing one continuous word idle word pair replicating the detected sequence of continuous word idle word pairs.

* * * * *